United States Patent
Gao et al.

(10) Patent No.: US 9,690,425 B2
(45) Date of Patent: Jun. 27, 2017

(54) SYSTEMS AND METHODS FOR TRACKING BASELINE SIGNALS FOR TOUCH DETECTION

(71) Applicant: Marvell World Trade Ltd., St. Michael (BB)

(72) Inventors: Kanke Gao, Fremont, CA (US); Bike Xie, San Jose, CA (US); Songping Wu, Cupertino, CA (US)

(73) Assignee: MARVEL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/628,606

(22) Filed: Feb. 23, 2015

(65) Prior Publication Data

US 2015/0242054 A1    Aug. 27, 2015

Related U.S. Application Data

(60) Provisional application No. 61/943,956, filed on Feb. 24, 2014.

(51) Int. Cl.
*G06F 3/041* (2006.01)
*G06F 3/044* (2006.01)

(52) U.S. Cl.
CPC ........... *G06F 3/0418* (2013.01); *G06F 3/044* (2013.01); *G06F 3/0416* (2013.01); *G06F 2203/04101* (2013.01)

(58) Field of Classification Search
CPC ...... G06F 3/0418; G06F 3/0416; G06F 3/044; G06F 3/04101
See application file for complete search history.

(56) References Cited

U.S. PATENT DOCUMENTS

| | | | |
|---|---|---|---|
| 2006/0103555 A1* | 5/2006 | Antonesei | H03H 17/0685 341/61 |
| 2013/0176268 A1* | 7/2013 | Li | G06F 3/044 345/174 |
| 2014/0092033 A1* | 4/2014 | Chang | G06F 3/0418 345/173 |
| 2014/0307840 A1* | 10/2014 | Ng | H04B 1/1027 375/350 |

* cited by examiner

*Primary Examiner* — Latanya Bibbins

(57) ABSTRACT

System and methods are provided for tracking baseline signals for touch detection. The system includes: a comparison network configured to determine whether an input baseline signal is within a tracking range; a filter network configured to generate an output baseline signal for touch detection based at least in part on the input baseline signal according to one or more filter parameters; and a signal processing component configured to update the one or more filter parameters based at least in part on the determination of whether the input baseline signal is within the tracking range.

17 Claims, 7 Drawing Sheets

SYSTEMS AND METHODS FOR TRACKING BASELINE SIGNALS FOR TOUCH DETECTION

CROSS-REFERENCE TO RELATED APPLICATIONS

This disclosure claims priority to and benefit from U.S. Provisional Patent Application No. 61/943,956, filed on Feb. 24, 2014, the entirety of which is incorporated herein by reference.

FIELD

The technology described in this patent document relates generally to electronic circuits and more particularly to touch detection circuits.

BACKGROUND

Touch screens have been incorporated into many electronic devices. For example, in some applications, a touch screen is combined with a display device, such as a liquid crystal display (LCD), to form a user interface for a portable electronic device. A touch screen may respond to a user's touch and convey information of the user's touch to a control circuit of the portable device. In other applications, a touch pad is often part of a user interface for a device, such as a personal computer, to replace a separate mouse for user interaction with an onscreen image.

A touch screen device may implement a capacitive touch-sensitive matrix and capacitance measurements may be performed to detect a touch event by way of a finger or a stylus. For example, comparison of capacitance measurements data with no-touch data is often carried out for touch detection.

SUMMARY

In accordance with the teachings described herein, system and methods are provided for tracking baseline signals for touch detection. The system includes: a comparison network configured to determine whether an input baseline signal is within a tracking range; a filter network configured to generate an output baseline signal for touch detection based at least in part on the input baseline signal according to one or more filter parameters; and a signal processing component configured to update the one or more filter parameters based at least in part on the determination of whether the input baseline signal is within the tracking range.

In one embodiment, a method is provided for tracking baseline signals for touch detection. Whether an input baseline signal is within a tracking range is determined. An output baseline signal for touch detection is generated based at least in part on the input baseline signal according to one or more filter parameters. The one or more filter parameters are output based at least in part on the determination of whether the input baseline signal is within the tracking range.

In another embodiment, a system for tracking baseline signals for touch detection includes: one or more data processors; and a computer-readable storage medium encoded with instructions for commanding the data processors to execute certain operations. Whether an input baseline signal is within a tracking range is determined. An output baseline signal for touch detection is generated based at least in part on the input baseline signal according to one or more filter parameters. The one or more filter parameters are output based at least in part on the determination of whether the input baseline signal is within the tracking range.

DETAILED DESCRIPTION

In a touch screen device, a baseline signal (e.g., corresponding to capacitance measurement data without any touch events) is often used as a reference for touch detection. For example, capacitance measurement data in response to a touch event decreases significantly compared to the baseline signal (i.e., the no-touch data). The detection of a user's touch depends on the accuracy of the baseline signal. However, a baseline signal is often affected by many factors, such as thermal noises (e.g., Gaussian noises), contamination (e.g., a water droplet), temperature and humidity changes. For example, the thermal noises may cause a fluctuation of the baseline signal around a certain value. The contamination (e.g., a water droplet) may cause rapid increase or decrease of the baseline signal. The temperature and humidity changes may cause gradual increase or decrease of the baseline signal. Conventionally, the variation of a baseline signal may not be quickly and effectively tracked, which results in inaccuracy in the baseline signal and thus inaccuracy in the touch detection result.

Figure 1:
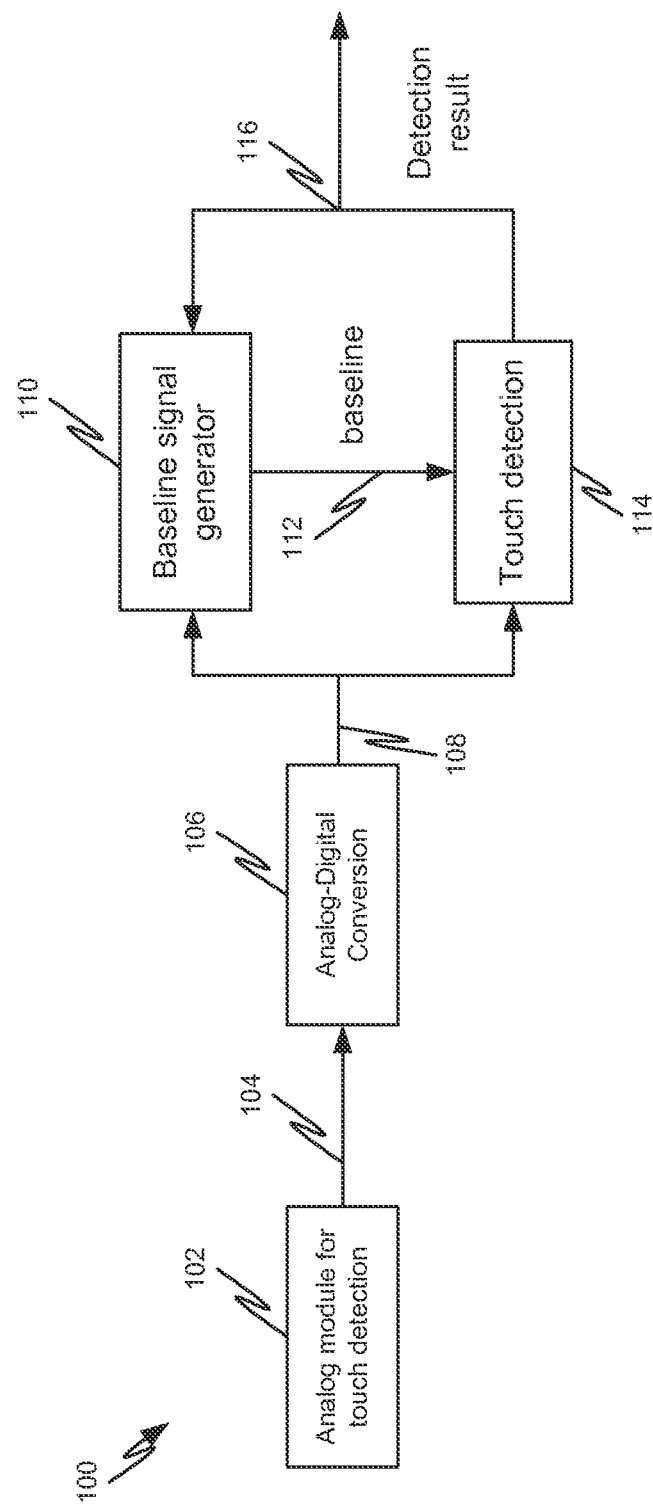
FIG. 1 depicts an example capacitive touch detection system.

FIG. 1 depicts an example capacitive touch detection system. As shown in FIG. 1, an analog module 102 detects a touch event through capacitance measurements, and generates an analog detection signal 104 (e.g., including raw capacitance measurement data). An analog-to-digital converter 106 converts the analog detection signal 104 to a digital signal 108. A baseline signal generator 110 provides a baseline signal 112 to a touch detection component 114 which compares the baseline signal 112 with the digital signal 108 to generate a detection result 116.

For example, the touch detection component 114 subtracts the baseline signal 112 from the digital signal 108 to yield the detection result 116 which indicates if a touch event occurs. A baseline tracking system may be implemented within the baseline signal generator 110 to track the variation of the baseline signal 112 so as to maintain the accuracy of the detection result 116.

Figure 2:
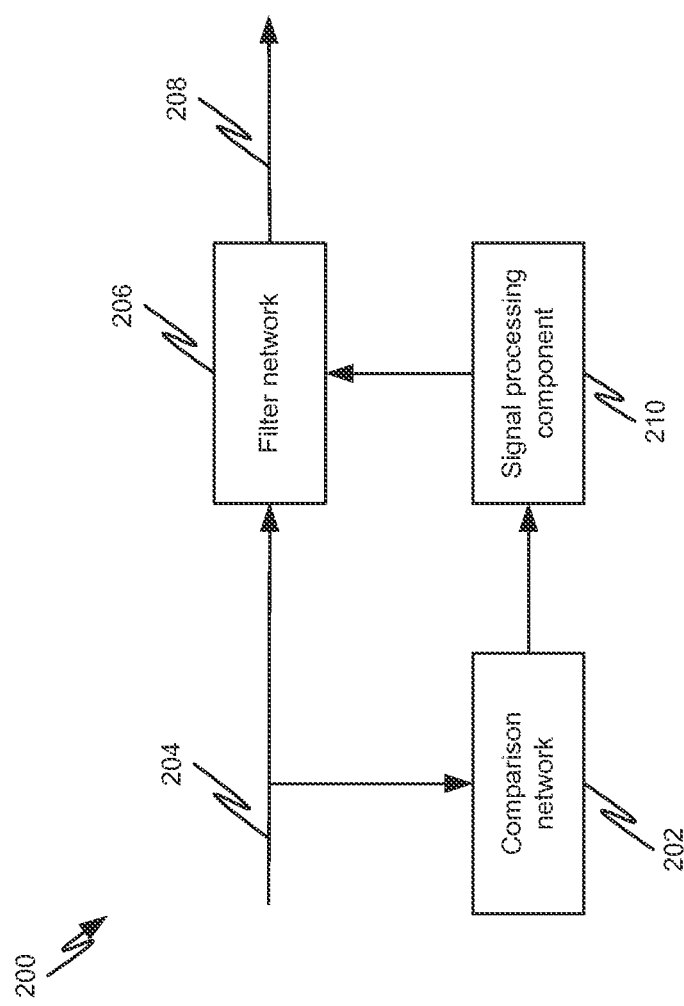
FIG. 2 depicts an example diagram of a baseline tracking system.

FIG. 2 depicts an example diagram of a baseline tracking system. As shown in FIG. 2, a filter network 206 processes an input baseline signal 204 according to one or more filter parameters and generates an output baseline signal 208 (e.g., the baseline signal 112). A comparison network 202 determines whether the input baseline signal 204 is within a tracking range. A signal processing component 210 updates the one or more parameters depending on whether the input baseline signal 204 is within the tracking range. For example, the input baseline signal 204 corresponds to raw untouched or ambient capacitance measurement data of a pixel, a group of pixels or an entire capacitive touch panel. The output baseline signal 208 is used for subsequent determination of a detection result (e.g., the detection result 116).

Figure 3:
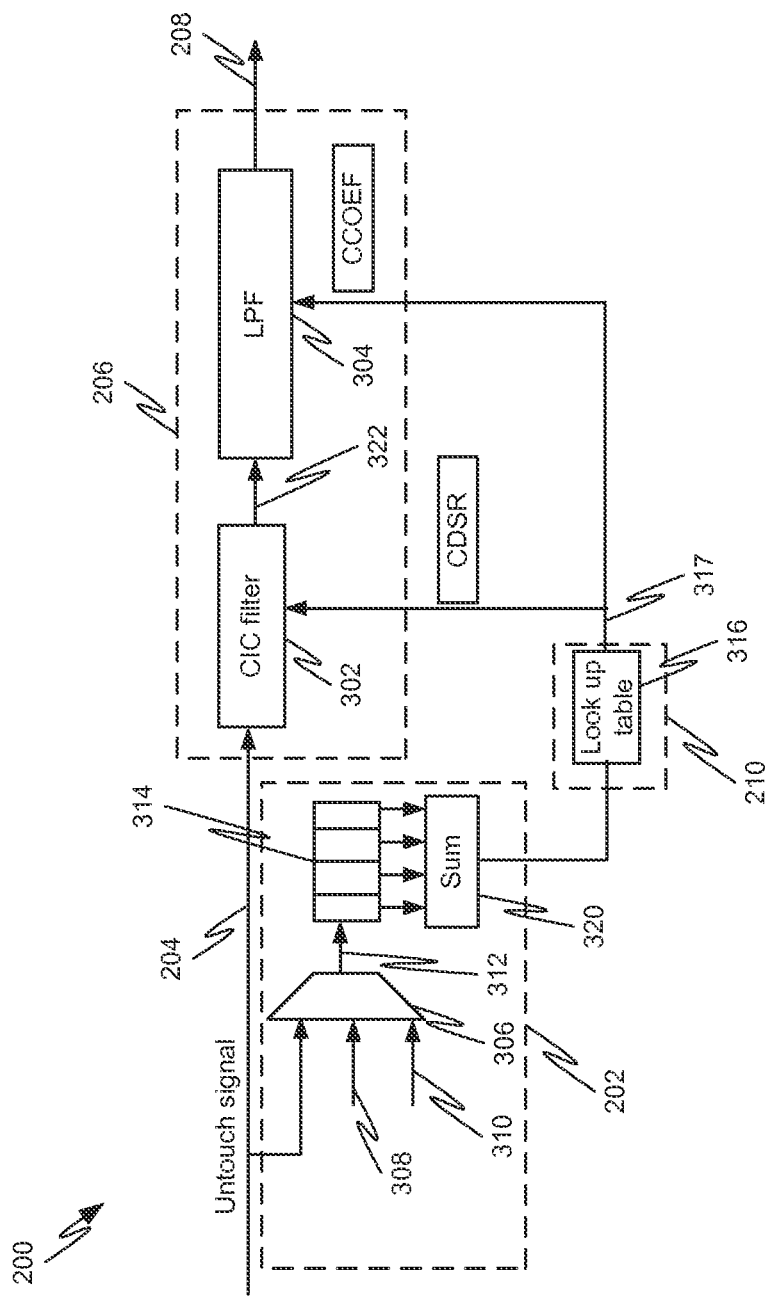
FIG. 3 depicts another example diagram of a baseline tracking system.

FIG. 3 depicts another example diagram of a baseline tracking system. As shown in FIG. 3, a cascaded integrator-comb (CIC) filter 302 and a low pass filter (LPF) 304 are included in the filter network 206 for processing the input baseline signal 204 according to the one or more filter parameters. A comparator 306 included in the comparison network 202 compares the input baseline signal 204 with an upper threshold 308 and a lower threshold 310 and generates a comparison result 312 to be stored in a buffer 314. A summation component 320 calculates a sum of the data stored in the buffer 314. The signal processing component 210 deter mines one or more values 317 based on the calculated sum using a lookup table 316, where the one or more values 317 correspond to the calculated sum in the lookup table 316. Then, a current down-sample rate (CDSR) of the CIC filter 302 and one or more current LPF coefficients (CCOEF) of the LPF 304 are updated using the determined one or more values 317. The LPF 304 generates the output baseline signal 208 for touch detection. In some embodiments, the lookup table 316 is not included in the signal processing component 210. In certain embodiments, the summation component 320 is not included in the comparator network 202.

Specifically, the upper threshold 308 and the lower threshold 310 are determined respectively as follows:

upper_threshold=baseline+delta lower_threshold=baseline−delta (Eq. 1)

where "baseline" represents a predetermined baseline value, and represents a distance parameter. For example, if the input baseline signal 204 falls below the lower threshold 310, the comparison result 312 is equal to −1. If the input baseline signal 204 goes above the upper threshold 308, the comparison result 312 is equal to 1. If the input baseline signal 204 falls between the upper threshold 308 and the lower threshold 310, the comparison result 312 is equal to 0.

In certain embodiments, the buffer 314 can store up to eight comparison results output from the comparator 306 (e.g., operating in a first-in-first-out manner). The summation component 320 adds up comparison results stored in the buffer 314 to calculate the sum. A combination of a down-sample rate value and an LPF coefficient value corresponds to the calculated sum in the lookup table 316 which is shown below:

| Lookup Table | |
|---|---|
| Sum | Combination |
| 8 | (4, 0.5) |
| 7 | (4, 0.5) |
| 6 | (8, 0.25) |
| 5 | (8, 0.25) |
| 4 | (16, 0.125) |
| 3 | (16, 0.125) |
| 2 | (64, 0.0625) |
| 1, 0 | (64, 0.0625) |
| −1 | (64, 0.0625) |
| −2 | (64, 0.0625) |
| −3 | (16, 0.125) |
| −4 | (16, 0.125) |

| Lookup Table | |
|---|---|
| Sum | Combination |
| −5 | (8, 0.25) |
| −6 | (8, 0.25) |
| −7 | (4, 0.5) |
| −8 | (4, 0.5) |

For example, if the calculated sum is equal to 0 which may indicate that eight consecutively sampled values of the input baseline signal 204 are all between the upper threshold 308 and the lower threshold 310, then, the corresponding combination of the down-sample rate value and the LPF coefficient value is determined to be (64, 0.0625) from the lookup table 316. That is, the down sample rate value is equal to 64, and the LPF coefficient value is equal to 0.0625.

If the calculated sum is equal to 8 which may indicate that eight consecutively sampled values of the input baseline signal 204 are all above the upper threshold 308, then, the corresponding combination of the down-sample rate value and the LPF coefficient value is determined to be (4, 0.5) from the lookup table 316. That is, the down sample rate value is equal to 4, and the LPF coefficient value is equal to 0.5. A low down-sample rate value corresponds to a high sampling frequency (e.g., high-speed baseline tracking) and the LPF 304 operates more frequently, which results in relatively high power consumption. On the other hand, a high down-sample rate value corresponds to a low sampling frequency (e.g., low-speed baseline tracking) and the LPF 304 operates less frequently, which results in relatively low power consumption. The baseline tracking system 200 adjusts the tracking speed and accuracy depending on whether the input baseline signal 204 falls within the tracking range defined by the upper threshold 308 and the lower threshold 310.

The determined combination of the down-sample rate value and the LPF coefficient value are used to update the CDSR of the CIC filter 302 and/or the CCOEF of the LPF 304. For example, the CDSR of the CIC filter 302 is updated to be N (e.g., an integer), which indicates that the CIC filter 302 samples the input baseline signal 204 N times (e.g., a cycle of the CIC filter 302) and calculates a moving average of the N sampled values of the input baseline signal 204. Then, the CIC filter 302 outputs a filtered signal 322 which is processed by the LPF 304.

The LPF 304 has a transfer function as follows:

$$H(z) = \frac{a}{1 - (1-a)z^{-1}} \quad \text{(Eq. 2)}$$

where a represents the CCOEF of the LPF 304. For example, if a is a small value, then an update weight for input is small and a pass bandwidth of the LPF 304 is small, which results in relatively high accuracy. If a is a large value, then the update weight for input is large and the pass bandwidth of the LPF 304 is large, which results in relatively low accuracy. In certain embodiments, the CDSR of the CIC filter 302 and/or the CCOEF of the LPF 304 are updated according to the determined combination of the down-sample rate value and the LPF coefficient value after the current cycle of the CIC filter 302 ends.

Figure 4:
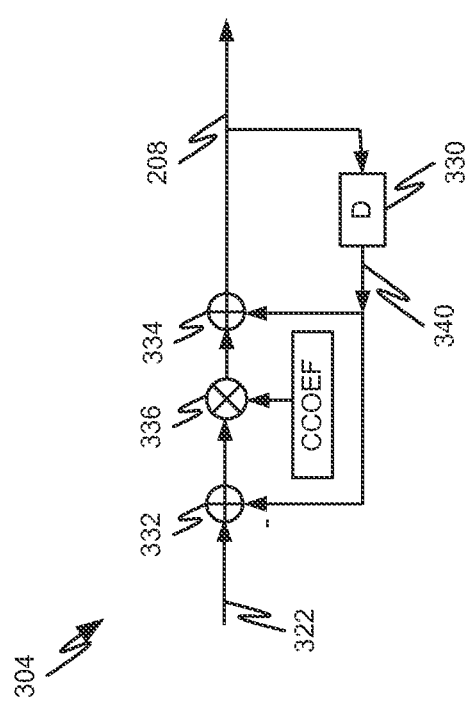
FIG. 4 depicts an example diagram of a low pass filter.

FIG. 4 depicts an example diagram of a low pass filter. As shown in FIG. 4, the LPF 304 includes a delay component 330 which provides a delayed previous output baseline signal 340 to two summation components 332 and 334. In addition, the LPF 304 includes a multiplication component 336 associated with the CCOEF. In some embodiments, the LPF 304 generates the output baseline signal 208 as a weighted sum of the filtered signal 322 and the delayed previous output baseline signal 340.

For example, the CDSR of the CIC filter 302 is equal to 8, and the CCOEF of the LPF 304 is equal to 0.25. Referring to FIG. 3, the input baseline signal 204 is sampled at a sampling frequency $f_s$. The CIC filter 302 receives multiple sampled values of the input baseline signal 204, and outputs the filtered signal 322 every eight sampling clock periods associated with the sampling frequency $f_s$. A weighted sum of the filtered signal 322 and the delayed previous output baseline signal 340 is calculated to be the output baseline signal 208, where the filtered signal 322 is assigned a weight of 0.25 and the delayed previous output baseline signal 340 is assigned a weight of 0.75.

Figure 5:
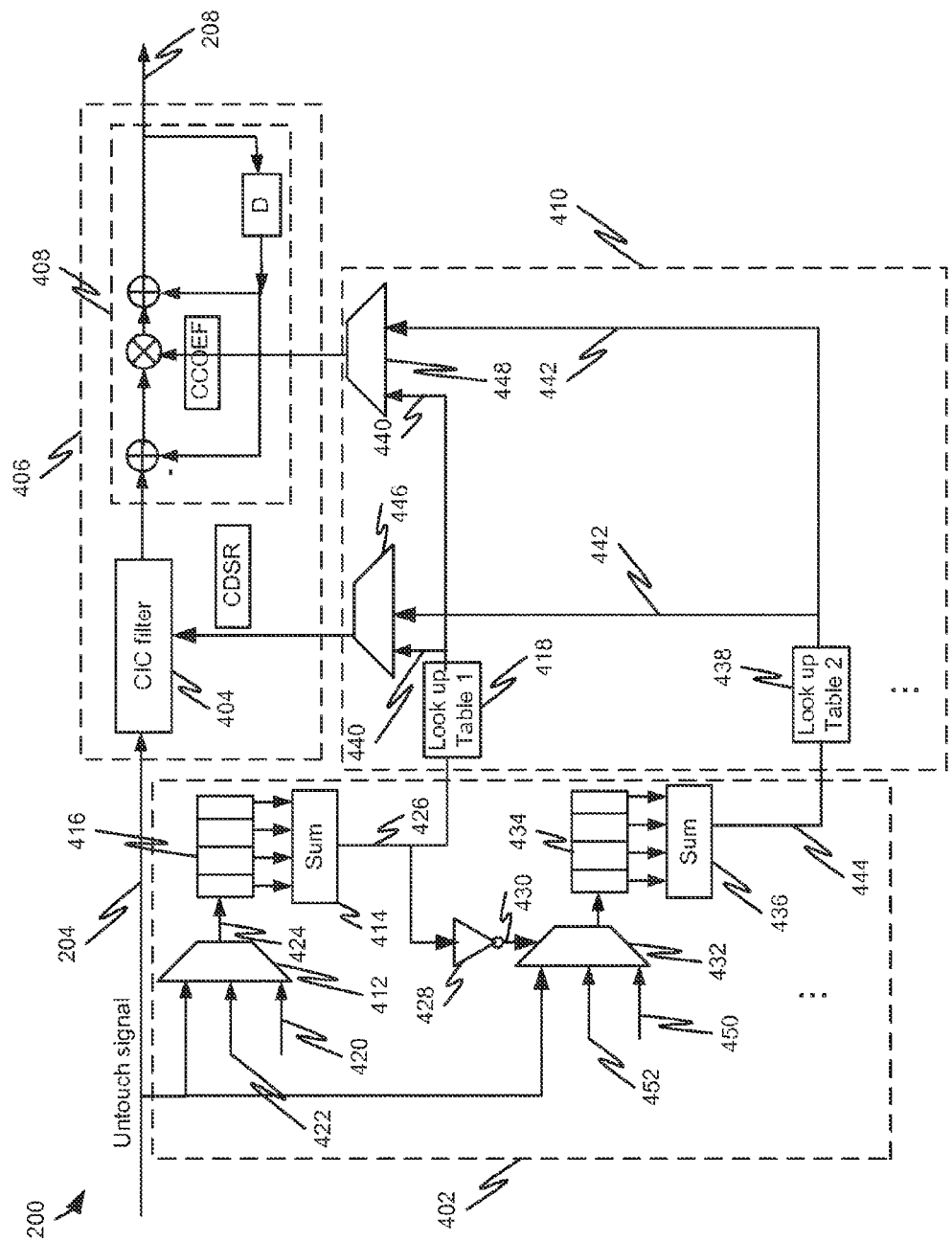
FIG. 5 depicts another example diagram of a baseline tracking system.

The baseline tracking system 200 may include a multi-layer structure. FIG. 5 depicts another example diagram of a baseline tracking system. As shown in FIG. 5, a filter network 406 processes the input baseline signal 204 according to one or more filter parameters and generates the output baseline signal 208. A comparison network 402 determines whether the input baseline signal 204 is within one or more tracking ranges. A signal processing component 410 updates the one or more filter parameters depending on whether the input baseline signal 204 is within the one or more tracking ranges. A CIC filter 404 and a LPF 408 are included in the filter network 406 for processing the input baseline signal 204 according to the one or more filter parameters.

Specifically, a first layer includes a comparator 412, a summation component 414, and a buffer 416 in the comparison network 402 and a lookup table 418 in the signal processing component 410. The comparator 412 compares the input baseline signal 204 with a first upper threshold 422 and a first lower threshold 420 and generates a first comparison result 424 to be stored in the buffer 416. For example, if the input baseline signal 204 falls below the first lower threshold 420, the first comparison result 424 is equal to −1. If the input baseline signal 204 goes above the first upper threshold 422, the first comparison result 424 is equal to 1. If the input baseline signal 204 falls between the first upper threshold 422 and the first lower threshold 420, the first comparison result 424 is equal to 0. The buffer 416 can store multiple (e.g., eight) outputs from the comparator 412. The summation component 414 calculates a sum 426 of all data stored in the buffer 416. One or more first values 440 are output to one or more multiplexers (e.g., the multiplexers 446 and 448) based on the calculated sum 426 using the lookup table 418, where the one or more first values 440 correspond to the calculated sum 427 in the lookup table 418. As an example, the one or more first values 440 include a combination of a first down-sample rate value and a first LPF coefficient value.

In some embodiments, the calculated sum 426 is equal to 0 which may indicate that consecutively sampled values of the input baseline signal 204 are all between the first upper threshold 422 and the first lower threshold 420. There a second layer that includes a comparator 432, a buffer 434 and a summation component 436 in the comparison network 402 and a lookup table 438 in the signal processing component 410 is activated. For example, a NOT gate 428 outputs a signal 430 to activate the comparator 432 and thus the second layer. The second layer operates similarly as the first layer. One or more second values 442 are output to the one or more multiplexers (e.g., the multiplexers 446 and 448) using the lookup table 438. As an example, the one or more second values 440 include a combination of a second down-sample rate value and a second LPF coefficient value. The one or more multiplexers may select the one or more second values 442 instead of the one or more first values 440 when the second layer is activated. In certain embodiments, if a calculated sum 444 from the summation component 436 is equal to 0, a third layer (not shown) may be activated similarly, and generate one or more third values to be output to the one or more multiplexers (e.g., the multiplexers 446 and 448). Thus, the structure shown in FIG. 5 can be extended further to more layers.

A CDSR of the CIC filter 404 and a CCOEF of the LPF 408 are updated using the outputs of the one or more multiplexers (e.g., the multiplexers 446 and 448). For example, the CDSR of the CIC filter 404 is updated using the output of the multiplexer 446, and the CCOEF of the LPF 408 is updated using the output of the multiplexer 448. In some embodiments, the CIC filter 404 and the LPF 408 are the same as the CIC filter 302 and the LPF 304, respectively.

For example, the first upper threshold 422 and the first lower threshold 420 are determined respectively as follows:

$$\text{upper\_threshold1} = \text{baseline0} + \text{delta1}$$

$$\text{lower\_threshold1} = \text{baseline0} - \text{delta1} \quad \text{(Eq. 3)}$$

where "baseline0" represents a baseline value, and "delta1" represents a first distance parameter. A second upper threshold 452 and a second lower threshold 450 associated with the comparator 423 in the second layer are determined respectively as follows:

$$\text{upper\_threshold2} = \text{baseline0} + \text{delta2}$$

$$\text{lower\_threshold2} = \text{baseline0} - \text{delta2} \quad \text{(Eq. 4)}$$

where "baseline0" represents the baseline value, and "delta2" represents a second distance parameter. In some embodiments, the first distance parameter is larger than the second distance parameter. That is, the first tracking range defined by the first upper threshold 422 and the first lower threshold 420 is broader than the second tracking range defined by the second upper threshold 452 and the second lower threshold 450. In addition, the lookup table 418 has larger variations of stored values (e.g., down-sampling rate values) with respect to the sum 426 than those in the lookup table 438 with respect to the sum 444. Thus, the first layer can cause a faster change of the tracking speed than the second layer. As such, the baseline tracking system 200 may use multiple layers to achieve different tracking speed changes.

Figure 6:
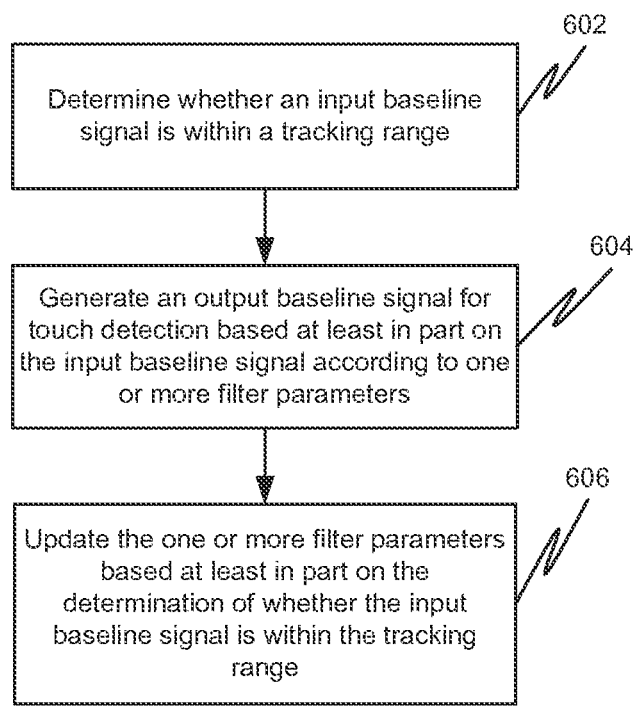
FIG. 6 depicts an example flow chart for tracking baseline signals for touch detection.

FIG. 6 depicts an example flow chart for tracking baseline signals for touch detection. At 602, whether an input baseline signal is within a tracking range is determined. At 604, an output baseline signal for touch detection is generated based at least in part on the input baseline signal according to one or more filter parameters. At 606, the one or more filter parameters are output based at least in part on the determination of whether the input baseline signal is within the tracking range. For example, the output baseline signal is used as a reference to compare with a touch detection signal to determine whether a touch event occurs. The adaptive update of the one or more filter parameters improves the accuracy of the output baseline signal.

Figure 7:
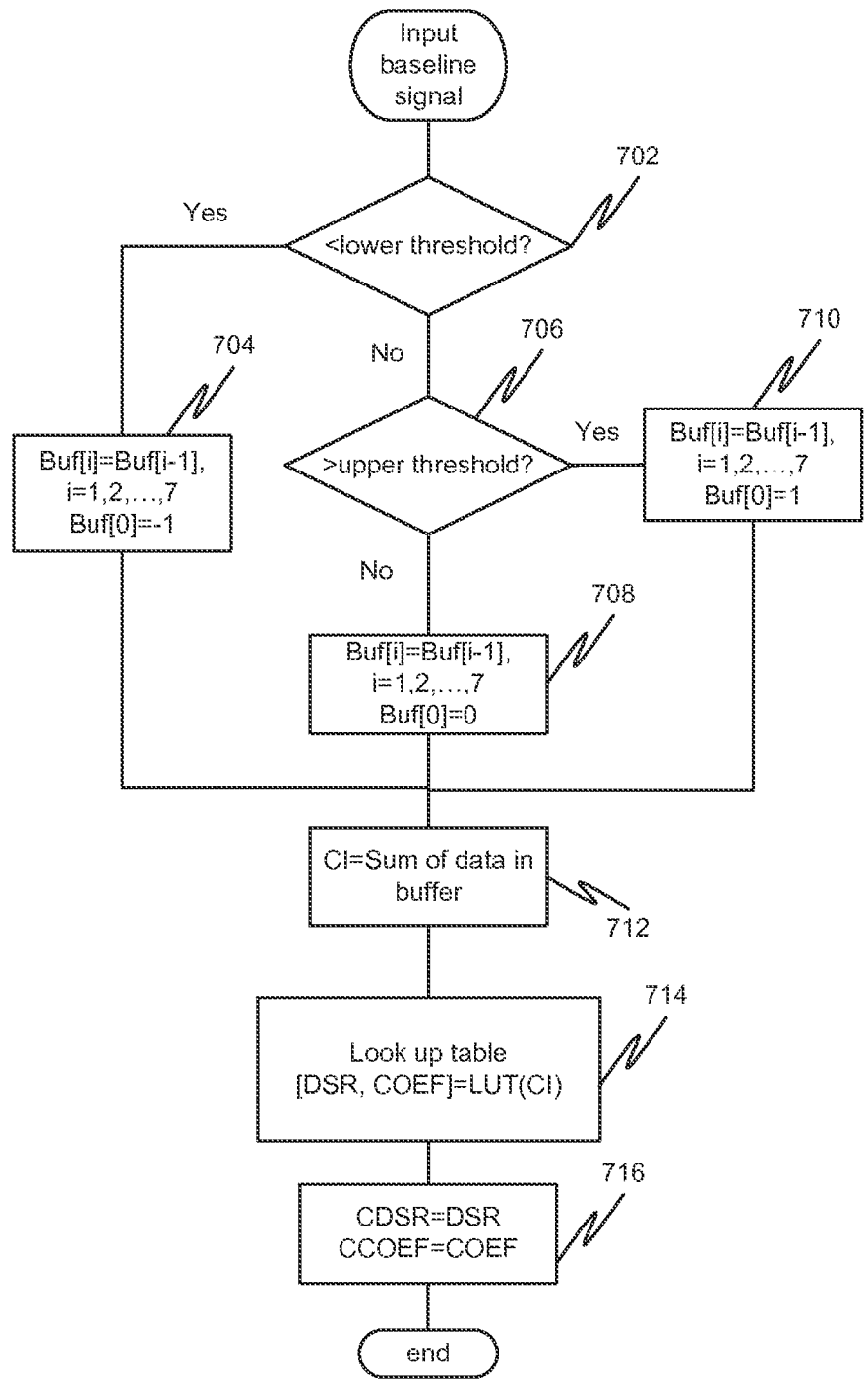
FIG. 7 depicts another example flow chart for tracking baseline signals for touch detection.

FIG. 7 depicts another example flow chart for tracking baseline signals for touch detection. At 702, an input baseline signal (e.g., raw untouched or ambient capacitance measurement data of a pixel, a group of pixels or an entire capacitive touch panel) is compared with a lower threshold. If the input baseline signal is smaller than the lower threshold, at 704, a comparison result of −1 is generated and stored to a buffer which includes multiple (e.g., eight) data entries and operates in a first-in-first-out manner. If the input baseline signal is no smaller than the lower threshold, at 706, the input baseline signal is compared with an upper threshold. If the input baseline signal is no larger than the upper threshold, at 708, a comparison result of 0 is generated and stored to the buffer. If the input baseline signal is larger than the upper threshold, at 710, a comparison result of 1 is generated and stored to the buffer. At 712, a sum of all data stored in the buffer is calculated. At 714, a combination of values (e.g., a down-sampling rate value, an LPF coefficient) corresponding to the calculated sum is determined using a lookup table. At 716, filter parameters of a CIC filter and a LPF are updated using the determined combination of values.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) fix use in execution by one or more processors to perform the methods' operations and implement the systems described herein.

What is claimed is:

1. A touch screen device for tracking baseline signals for touch detection, the touch screen device comprising:
   a comparison network configured to
      determine whether an input baseline signal is within a tracking range, and
      generate a comparison result indicating whether the input baseline signal is within the tracking range;
   a filter network configured to generate an output baseline signal for touch detection based at least in part on the input baseline signal according to one or more filter parameters; and
   a signal processing component configured to
      determine one or more predetermined values using a lookup table based at least in part on the comparison result,
      update the one or more filter parameters based at least in part on the determination of whether the input baseline signal is within the tracking range and using the one or more predetermined values,
      store the comparison result in a buffer, and
      generate a sum of data stored in the buffer, the sum of data corresponding to the one or more predetermined values in the lookup table.

2. The system of claim 1, wherein:
   the tracking range includes an upper threshold and a lower threshold,
   the comparison network is further configured to:
      determine whether the input baseline signal is lower than the lower threshold; in response to the input baseline signal being lower than the lower threshold, generate a first comparison result;
      in response to the baseline signal being higher than the lower threshold, determine whether the baseline signal is higher than the upper threshold;
      in response to the baseline signal being higher than the upper threshold, generate a second comparison result; and
      in response to the baseline signal being no lower than the lower threshold and no higher than the upper threshold, generate a third comparison result.

3. The system of claim 1, wherein the filter network includes:
   a cascaded integrator-comb filter configured to sample the input baseline signal according to one or more sampling rate parameters and generate a filtered signal based at least in part on the sampled values of the input baseline signal, the one or more sampling rate parameters being included in the one or more filter parameters.

4. The system of claim 3, wherein the cascaded integrator-comb filter is further configured to sample the input baseline signal a number of times according to the one or more sampling rate parameters.

5. The system of claim 3, wherein the filtered signal corresponds to an average of the sampled values of the input baseline signal.

6. The system of claim 3, wherein the filter network further includes:
   a low pass filter configured to generate the output baseline signal based at least in part on the filtered signal according to one or more coefficients, the one or more coefficients being included in the one or more filter parameters.

7. The system of claim 6, wherein the low pass filter is further configured to generate the output baseline signal as a weighted sum of the filtered signal and a previous output signal of the low pass filter.

8. The system of claim 1, wherein:
   the comparison network includes:
      a first comparator configured to determine whether the input baseline signal is within the tracking range; and
      a second comparator configured to, in response to the input baseline being within the tracking range, determine whether the input baseline signal is with a secondary range; and
   the signal processing component is further configured to update the one or more filter parameters based at least in part on the determination of whether the input baseline signal is within the secondary range.

9. A touch screen device for tracking baseline signals for touch detection, the touch screen device comprising:
   a comparison network configured to determine whether an input baseline signal is within a tracking range;
   a filter network configured to generate an output baseline signal for touch detection based at least in part on the input baseline signal according to one or more filter parameters; and
   a signal processing component configured to update the one or more filter parameters based at least in part on the determination of whether the input baseline signal is within the tracking range;
   wherein the filter network includes:
      a cascaded integrator-comb filter configured to sample the input baseline signal according to one or more sampling rate parameters and generate a filtered signal based at least in part on the sampled values of the input baseline signal, the one or more sampling rate parameters being included in the one or more filter parameters, and a low pass filter configured to generate the output baseline signal based at least in part on the filtered signal according to one or more coefficients, the one or more coefficients being included in the one or more filter parameters; and wherein the low pass filter includes:
a delay component configured to provide a previous output signal of the low pass filter;
a first summation component configured to generate a first summation signal based at least in part on the filtered signal and the previous output signal;
a multiplication component configured to generate a multiplication signal based at least in part on the first summation signal according to the one or more coefficients; and
a second summation component configured to generate the output baseline signal based at least in part on the multiplication signal.

10. A touch screen device for tracking baseline signals for touch detection, the touch screen device comprising:
a comparison network configured to determine whether an input baseline signal is within a tracking range;
a filter network configured to generate an output baseline signal for touch detection based at least in part on the input baseline signal according to one or more filter parameters; and
a signal processing component configured to update the one or more filter parameters based at least in part on the determination of whether the input baseline signal is within the tracking range;
wherein:
the comparison network includes (i) a first comparator configured to determine whether the input baseline signal is within the tracking range and (ii) a second comparator configured to, in response to the input baseline being within the tracking range, determine whether the input baseline signal is with a secondary range;
the signal processing component is further configured to update the one or more filter parameters based at least in part on the determination of whether the input baseline signal is within the secondary range;
wherein:
the comparison network further includes: a third comparator configured to, in response to the input baseline being within the secondary range, determine whether the input baseline signal is with a tertiary range; and
the signal processing component is further configured to update the one or more filter parameters based at least in part on the determination of whether the input baseline signal is within the tertiary range.

11. A method for tracking baseline signals for touch detection, the method comprising:
generating, by a touch screen device, an input baseline signal;
determining whether the input baseline signal is within a tracking range;
generating a comparison result indicating whether the input baseline signal is within the tracking range;
generating an output baseline signal for touch detection based at least in part on the input baseline signal according to one or more filter parameters; and determining one or more predetermined values using a lookup table based at least in part on the comparison result;
updating the one or more filter parameters based at least in part on the determination of whether the input baseline signal is within the tracking range and using the one or more predetermined values
storing the comparison result in a buffer, and
generating a sum of data stored in the buffer, the sum of data corresponding to the one or more predetermined values in the lookup table.

12. The method of claim 11, wherein:
the tracking range includes an upper threshold and a lower threshold,
the method further comprises:
determining whether the input baseline signal is lower than the lower threshold; in response to the input baseline signal being lower than the lower threshold, generating a first comparison result;
in response to the baseline signal being higher than the lower threshold, determining whether the baseline signal is higher than the upper threshold;
in response to the baseline signal being higher than the upper threshold, generating a second comparison result; and
in response to the baseline signal being no lower than the lower threshold and no higher than the upper threshold, generating a third comparison result.

13. The method of claim 11, further comprising:
sampling the input baseline signal using a cascaded integrator-comb filter according to one or more sampling rate parameters; and
generating a filtered signal based at least in part on the sampled values of the input baseline signal, the one or more sampling rate parameters being included in the one or more filter parameters.

14. The method of claim 13, further comprising:
generating the output baseline signal using a low pass filter based at least in part on the filtered signal according to one or more coefficients, the one or more coefficients being included in the one or more filter parameters.

15. The method of claim 13, wherein the filtered signal corresponds to an average of the sampled values of the input baseline signal.

16. The method of claim 11, further comprising:
generating a comparison result indicating whether the input baseline signal is within the tracking range;
wherein the updating the one or more filter parameters based at least in part on the determination of whether the input baseline signal is within the tracking range includes: determining one or more predetermined values using a lookup table based at least in part on the comparison result; and
updating the one or more filter parameters using the one or more predetermined values.

17. The method of claim 11, further comprising:
in response to the input baseline being within the tracking range, determining whether the input baseline signal is with a secondary range; and
updating the one or more filter parameters based at least in part on the determination of whether the input baseline signal is within the secondary range.

* * * * *

UNITED STATES PATENT AND TRADEMARK OFFICE
CERTIFICATE OF CORRECTION

PATENT NO. : 9,690,425 B2
APPLICATION NO. : 14/628606
DATED : June 27, 2017
INVENTOR(S) : Gao, Xie and Wu It is certified that error appears in the above-identified patent and that said Letters Patent is hereby corrected as shown below:

On the Title Page

At item (73) Assignee, delete "Marvel World Trade Ltd." and insert -- Marvell World Trade Ltd. --

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*